B. C. Davis.
Scrub Brush.
No. 99,648.        Patented Feb. 8, 1870.
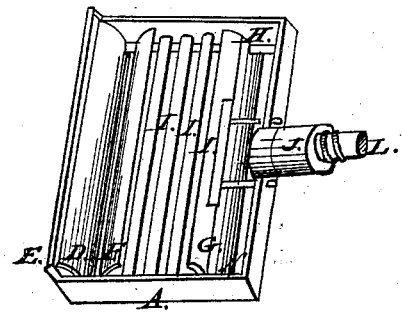
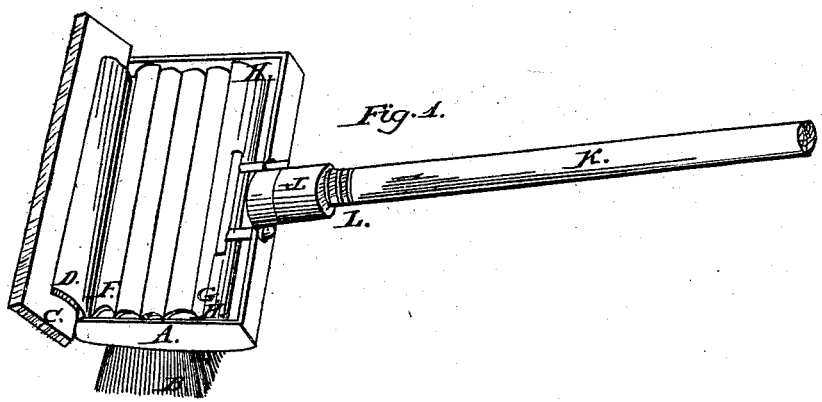
Witnesses:
Donald Grant
Wm M DeLong
Inventor:
Biram C. Davis

United States Patent Office.

BIRAM C. DAVIS, OF BINGHAMTON, NEW YORK; ASSIGNOR OF ONE-THIRD TO WILLIAM M. DE LONG, AND ONE-THIRD TO WILLIAM F. MILLS, OF SAME PLACE.

Letters Patent No. 99,648, dated February 8, 1870.

IMPROVED MOP AND RUBBER SCRUBBER.

The Schedule referred to in these Letters Patent and making part of the same.

I, BIRAM C. DAVIS, of Binghamton, county of Broome, State of New York, have invented an Improved Combined Mop and Rubber Scrubber, of which the following is a specification.

The nature and object, first, relates to the combination of a cloth brush and rubber scrubber, constructed in such a manner that the mop shall be capable of distributing the water freely upon the unclean surface, and also, to penetrate crevices, and that part of the surface the rubber scrubber has no effect on; but the plain surface shall be more readily scrubbed with the rubber than heretofore accomplished.

Second part relates to the manner I clamp the material in the head for the scrubber, which is so arranged by a single screw, it shall be capable of clamping firmly both cloth, or its equivalent, and rubber in their places.

Description of the Accompanying Drawings.

Figure 1 is the combined mop and rubber scrubber, as shown, ready for use.

Figure 2 is a plan of part of the same.

General description is as follows:

A is the frame, which should be made light, and of strong metal.

B is the mop, or sponge may be used instead, or anything that will produce the intended effect.

C is the rubber, which is clamped firmly in the jaws D and E.

F and G are the jaws that the cloth is clamped in, which slide securely on the flanges H H of the frame, in placing and replacing the materials in the head, fig. 2.

The cloth is doubled over a series of rods, I I I, and placed in on the flanges H H. The rubber is also placed between the jaws D and E.

By turning the thimble-nut J, the cloth and rubber are clamped firmly in their places, after which the cloth, or its equivalent, is trimmed to the length desired.

K is the handle, which is of hard wood, and made of any length desired. By using this invention, in numerous cases quite a short handle would be preferred, which is to be slipped in the socket L, and the arrangement is ready for use, as shown in fig. 1.

To operate this combined mop and rubber scrubber, I take it by the handle K and dip it into the water, and with the mop B I distribute the water freely on the unclean surface, and with the same I scrub out crevices and that part the rubber would have no effect on. Then I use the rubber with more facility, which has no absorbing qualities for distributing water.

Thus the combination is a decided improvement for the purpose intended.

I claim the combination and arrangement of the frame A, clamps D E F G, series of rods I I I, and thimble-nut J, the whole being arranged substantially as shown and described, for the purpose specified.

BIRAM C. DAVIS.

Witnesses:
DONALD GRANT,
WM. M. DELONG.